US011682836B2

(12) United States Patent
Eslami

(10) Patent No.: US 11,682,836 B2
(45) Date of Patent: Jun. 20, 2023

(54) METHOD AND SYSTEM FOR CONTROLLING A MODAL ANTENNA

(71) Applicant: AVX Antenna, Inc., San Diego, CA (US)

(72) Inventor: Hamid Eslami, San Diego, CA (US)

(73) Assignee: KYOCERA AVX COMPONENTS (SAN DIEGO), INC., San Diego, CA (US)

( * ) Notice: Subject to any disclaimer, the term of this patent is extended or adjusted under 35 U.S.C. 154(b) by 0 days.

(21) Appl. No.: 17/536,407

(22) Filed: Nov. 29, 2021

(65) Prior Publication Data

US 2022/0085503 A1    Mar. 17, 2022

Related U.S. Application Data

(63) Continuation of application No. 16/944,182, filed on Jul. 31, 2020, now Pat. No. 11,189,925.

(Continued)

(51) Int. Cl.
*H01Q 5/378* (2015.01)
*H01Q 23/00* (2006.01)
(Continued)

(52) U.S. Cl.
CPC .............. *H01Q 5/378* (2015.01); *H01Q 9/42* (2013.01); *H01Q 23/00* (2013.01); *H04L 1/0007* (2013.01); *H04L 1/206* (2013.01); *H01Q 25/005* (2013.01)

(58) Field of Classification Search
CPC .......... H01Q 5/378; H01Q 23/00; H01Q 9/42; H01Q 25/005; H04L 1/0007; H04L 1/206

(Continued)

(56) References Cited

U.S. PATENT DOCUMENTS 5,812,066 A    12/1998  Terk et al.
6,765,536 B2   7/2004   Phillips et al.
(Continued)

FOREIGN PATENT DOCUMENTS

EP    3457586 A1    3/2019
KR    10-2015-0138339    12/2015

OTHER PUBLICATIONS

International Search Report and Written Opinion for Application No. PCT/US2020/044478, dated Nov. 3, 2020, 10 pages.

(Continued)

*Primary Examiner* — Don N Vo
(74) *Attorney, Agent, or Firm* — Dority & Manning, P.A.

(57) ABSTRACT

An antenna system is provided. In one example, the system includes a modal antenna having a driven element and a parasitic element. The system includes a radio frequency circuit. The system includes a transmission line coupling the radio frequency circuit to the modal antenna. The radio frequency circuit is configured to modulate a control signal onto an RF signal to generate a transmit signal for communication over the transmission line to the tuning circuit. The control signal can include a frame having a plurality of bits associated with the selected mode of the antenna. The radio frequency circuit is configured to encode the plurality of bits associated with the selected mode in accordance with a coding scheme. The coding scheme specifies a unique code for each mode of the plurality of modes. The unique code for each mode of the plurality of modes differs by at least two bits relative to the unique code for each other mode of the plurality of modes.

18 Claims, 13 Drawing Sheets

Related U.S. Application Data

(60) Provisional application No. 62/881,464, filed on Aug. 1, 2019.

(51) Int. Cl.
  *H04L 1/00* (2006.01)
  *H04L 1/20* (2006.01)
  *H01Q 9/42* (2006.01)
  *H01Q 25/00* (2006.01)

(58) Field of Classification Search
  USPC .................................. 375/257, 295, 300, 309
  See application file for complete search history.

(56) References Cited

U.S. PATENT DOCUMENTS

| | | |
|---|---|---|
| 6,987,493 B2 | 1/2006 | Chen |
| 7,068,234 B2 | 6/2006 | Sievenpiper |
| 7,215,289 B2 | 5/2007 | Harano |
| 7,830,320 B2 | 11/2010 | Shamblin |
| 7,911,402 B2 | 3/2011 | Rowson et al. |
| 8,362,962 B2 | 1/2013 | Rowson et al. |
| 8,446,318 B2 | 5/2013 | Ali et al. |
| 8,648,755 B2 | 2/2014 | Rowson et al. |
| 8,717,241 B2 | 5/2014 | Shamblin et al. |
| 9,065,496 B2 | 6/2015 | Rowson et al. |
| 9,231,669 B2 | 1/2016 | Desclos et al. |
| 9,240,634 B2 | 1/2016 | Rowson et al. |
| 9,425,497 B2 | 8/2016 | Pajona et al. |
| 9,439,151 B2 | 9/2016 | Zhu et al. |
| 9,479,242 B2 | 10/2016 | Desclos et al. |
| 9,590,703 B2 | 3/2017 | Desclos et al. |
| 9,755,305 B2 | 9/2017 | Deslos et al. |
| 9,755,580 B2 | 9/2017 | Desclos et al. |
| 10,263,817 B1 | 4/2019 | Roe et al. |
| 11,189,925 B2* | 11/2021 | Eslami .................. H04L 1/0041 |
| 2012/0229307 A1* | 9/2012 | Tsai ...................... G06F 3/0231 |
| | | 375/300 |
| 2013/0012144 A1 | 1/2013 | Besoli et al. |
| 2014/0064409 A1* | 3/2014 | Bisig .................... H04B 7/0404 |
| | | 375/299 |
| 2014/0099982 A1* | 4/2014 | Desclos ................ H04B 15/00 |
| | | 455/501 |
| 2014/0133525 A1 | 5/2014 | Desclos et al. |
| 2016/0048163 A1 | 2/2016 | Degner et al. |
| 2016/0335857 A1* | 11/2016 | Wedig ..................... G08B 1/08 |
| 2017/0012681 A1 | 1/2017 | Buliga et al. |
| 2017/0155194 A1 | 6/2017 | Kanno |
| 2017/0338557 A1 | 11/2017 | Desclos et al. |
| 2018/0277963 A1 | 9/2018 | Desclos et al. |
| 2018/0351255 A1 | 12/2018 | Singh et al. |
| 2020/0091608 A1 | 3/2020 | Alpman et al. |

OTHER PUBLICATIONS

Extended European Search Report for Application No. 20847393.4, dated Dec. 9, 2022, 5 pages.

* cited by examiner

METHOD AND SYSTEM FOR CONTROLLING A MODAL ANTENNA

PRIORITY CLAIM

The present application is a continuation of U.S. application Ser. No. 16/944,182, titled "Method and System for Controlling a Modal Antenna," filed on Jul. 31, 2020, which claims the benefit of priority of U.S. Provisional Application Ser. No. 62/881,464, titled "Method and System for Controlling a Modal Antenna," filed on Aug. 1, 2019, which is incorporated herein by reference.

FIELD

Example aspects of the present disclosure relate generally to the field of antenna control, for instance, the control of modal antennas configured to operate in a plurality of different modes.

BACKGROUND

Modal antennas are being increasingly used in wireless communication, for instance in smartphone handsets. Such antennas generally provide improved signal quality and a more compact form factor than traditional passive antennas. One modal antenna configuration involves a parasitic element configured to alter a radiation pattern associated with a driven element.

SUMMARY

Aspects and advantages of embodiments of the present disclosure will be set forth in part in the following description, or can be learned from the description, or can be learned through practice of the embodiments.

One example aspect of the present disclosure is directed to an antenna system. The system includes a modal antenna having a driven element and a parasitic element. The modal antenna operable in a selected mode of a plurality of modes. Each mode of the plurality of modes associated with a different radiation pattern or polarization. The system includes a tuning circuit configured to control an electrical characteristic associated with the parasitic element to operate the modal antenna in each of the plurality of modes. The system includes a radio frequency circuit. The system includes a transmission line coupling the radio frequency circuit to the modal antenna. The radio frequency circuit is configured to modulate a control signal onto an RF signal to generate a transmit signal for communication over the transmission line to the tuning circuit. The control signal can include a frame having a plurality of bits associated with the selected mode of the antenna. The radio frequency circuit is configured to encode the plurality of bits associated with the selected mode in accordance with a coding scheme. The coding scheme specifies a unique code for each mode of the plurality of modes. The unique code for each mode of the plurality of modes differs by at least two bits relative to the unique code for each other mode of the plurality of modes. The tuning circuit is configured to demodulate the control signal such that the tuning circuit can adjust a mode of the modal antenna based at least in part on the control signal.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1A:
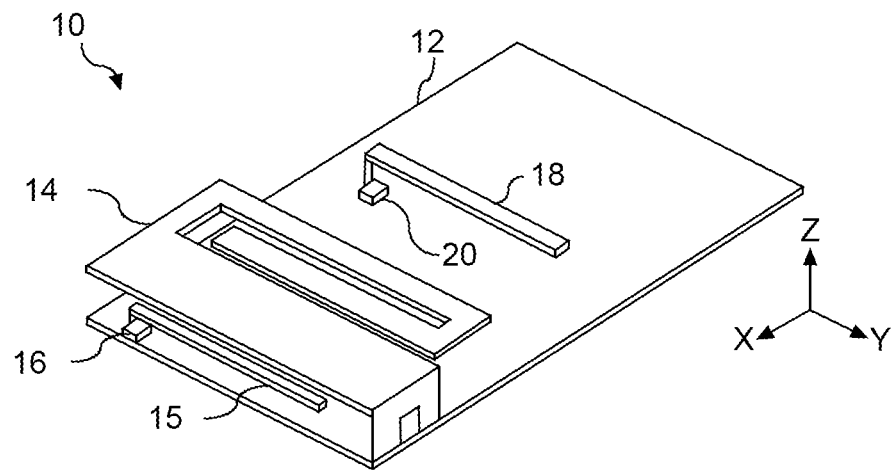
FIG. 1A illustrates an embodiment of a modal antenna according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to an antenna system. The antenna system can include a modal antenna including a driven element and a parasitic element positioned proximate to the driven element. The modal antenna can be operable in a plurality of different modes, and each mode can be associated with a different radiation pattern and/or polarization state. The antenna system can include a tuning circuit that is configured to control an electrical characteristic associated with the parasitic element to operate the modal antenna in the plurality of different modes.

The antenna system can include a radio frequency circuit and a transmission line (e.g., a single coaxial cable) coupling the radio frequency circuit to the modal antenna. The radio frequency circuit can be configured to modulate a control signal onto an RF signal using, for instance, amplitude-shift keying modulation or other suitable modulation to generate a transmit signal for communication over the transmission line to the tuning circuit. The tuning circuit can be configured to demodulate the control signal such that the tuning circuit can adjust a mode of the modal antenna based at least in part on the control signal. For instance, the tuning circuit can control the modal antenna to operate in a selected mode of the plurality of modes based at least in part on the control signal.

According to example aspects of the present disclosure, the control signal can be communicated in one or more frames over the transmission line. Each frame an include a plurality of bits. The frame(s) can include, for instance, one or more bits associated with a header and/or one or more bits associated with a payload (e.g., the selected mode of the plurality of modes). The tuning circuit can be configured to decode the one or more bits in the payload of the frame to extract the selected mode for configuring the modal antenna.

In some instances, a frame can include one or more errors. More particularly, one or more bits of the frame can be improper as a result of the modulation and/or demodulation of the control signal onto the RF signal for communication over the transmission line and/or as a result of noise and/or interference. Controlling the mode of a modal antenna based on errors in the control signal can result in improper configuration of the modal antenna, leading to communication errors, reduced efficiency of the modal antenna, and other concerns.

According to example aspects of the present disclosure, the RF signal can be configured to encode the control signal in accordance with a coding scheme that increases error detection by the tuning circuit. For instance, the coding scheme can assign a unique code to each mode of the plurality of modes. In some embodiments, the unique code can be encoded using 11 bits or more (e.g., 11 bits, 21 bits). The unique code for each mode can differ by at least two bits relative to the unique code for each other mode in the plurality of modes, such as by at least three bits, such as by at least four bits, such as by at least five bits, such as by at least six bits, such as by at least seven bits, such as by at least eight bits, etc. In this way, the unique code for each mode in the plurality of modes is separated a significant distance (e.g., in terms of number of bits) from the unique code for each of the other antenna modes.

When demodulating the control signal, the tuning circuit can be configured to determine if the one or more bits in the frame(s) are associated with one of the unique codes assigned to one of the plurality of modes. If so, the tuning circuit can determine that no error is present and can control the modal antenna in accordance with the selected mode specified by the unique code. If the tuning circuit determines that one or more bits in the frame(s) are not associated with one of the unique codes assigned to one of the plurality modes, the tuning circuit can determine that an error is present. By using a large number of bits (e.g., 6 bits or more, 11 bits or more, 21 bits or more) to encode the each mode of the plurality of modes, the unique codes can be separated a sufficient distance for the plurality of modes to easily to detect an error when only one or two of the bits in the frame(s) are in error.

Upon detection of the error, the tuning circuit can be configured to maintain the modal antenna in its current mode until another control signal is received. Alternatively, the tuning circuit can determine a closest unique code based on the received plurality of bits in the frame(s). The tuning circuit can control the modal antenna in accordance with the mode associated with the closest unique code.

In some embodiments, to further enhance robustness of the system, the RF circuit can be configured to communicate control signal(s) using alternating frames of differing sizes. For instance, the RF circuit can alternate communicating frames of a first frame size (e.g., 11 bits) and a second frame size (e.g., 21 bits). The first frame can include a plurality of bits encoded with unique codes according to a first coding scheme. The first coding scheme can assign unique codes with the number of bits in the first frame size (e.g., 11 bits) for each mode in the plurality of modes. The second frame can include a plurality of bits encodes with unique codes according to a second coding scheme. The second coding scheme can assign unique codes with the number of bits (e.g., 21 bits) in the second frame size for each mode in the plurality of modes.

The tuning circuit can be configured to alternately process the frames of differing sizes. For instance, the tuning circuit can process a first frame associated with the first frame size to extract a first select mode using the first coding scheme. The tuning circuit can then process a second frame with the second frame size to extract a second selected mode using the second coding scheme. When a frame does not match up with a unique code according to the expected coding scheme, the tuning circuit can be configured to detect an error.

The systems and methods according to example embodiments of the present disclosure provide a number of technical effects and benefits. For instance, communicating control signals according to example aspects of the present disclosure can increase error detection, leading to reduced operating errors that can result from, for instance, noise and/or interference. In addition, in some embodiments, the correct antenna mode can be extracted from control signals with more frequency as a result of the ability to identify correct modes from frames, leading to more robust, efficient, and reliable antenna systems.

FIG. 1A illustrates an example embodiment of a modal antenna 10 in accordance with aspects of the present disclosure. The modal antenna 10 can include a circuit board 12 (e.g., including a ground plane) and a driven antenna element 14 disposed on the circuit board 12. An antenna volume can be defined between the circuit board (e.g., and the ground plane) and the driven antenna element. A first parasitic element 15 can be positioned at least partially within the antenna volume. A first active tuning element 16 can be coupled with the parasitic element 15. The first active tuning element 16 can be a passive or active component or series of components and can be configured to alter a reactant on the first parasitic element 14 either by way of a variable reactance, or shorting to ground, resulting in a frequency shift of the antenna.

In some embodiments, a second parasitic element 18 can be disposed proximate the circuit board 12 and can be positioned outside of the antenna volume. The second parasitic element 18 can further include a second active tuning element 20 which can individually include one or more active and/or passive components. The second parasitic element 18 can be positioned adjacent the driven element 14 and can also be positioned outside of the antenna volume.

The described configuration can provide an ability to shift the radiation pattern characteristics of the driven antenna element by varying a reactance thereon. Shifting the antenna radiation pattern can be referred to as "beam steering". In instances where the antenna radiation pattern comprises a null, a similar operation can be referred to as "null steering" since the null can be shifted to an alternative position about the antenna (e.g., to reduce interference). In some embodiments, the second active tuning element 20 can include a switch for connecting the second parasitic to ground when "On" and for terminating the short when "Off". It should however be noted that a variable reactance on either of the first or second parasitic elements, for example by using a variable capacitor or other tunable component, can further provide a variable shifting of the antenna pattern or the frequency response. For example, the first active tuning element 16 and/or second active tuning element 18 can include at least one of a tunable capacitor, MEMS device, tunable inductor, switch, a tunable phase shifter, a field-effect transistor, or a diode.

Figure 1B:
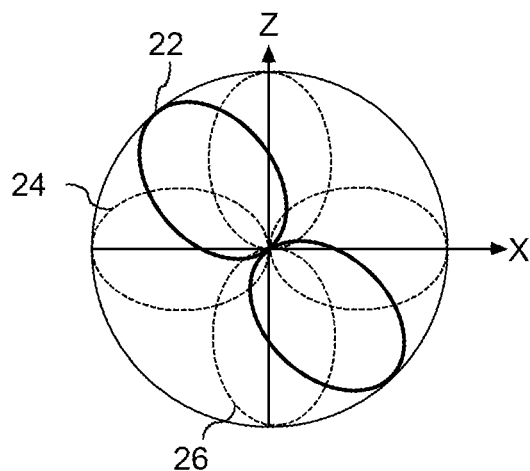
FIG. 1B illustrates a two-dimensional antenna radiation pattern associated with the modal antenna of FIG. 1A.

FIG. 1B illustrates a two-dimensional antenna radiation pattern associated with the modal antenna of FIG. 1A. The radiation pattern can be shifted by controlling an electrical characteristic associated with at least one of the first and second parasitic elements 16, 18 of the modal antenna 10. For example, in some embodiments, the radiation pattern can be shifted from a first mode 22 to a second mode 24, or a third mode 26.

Figure 1C:
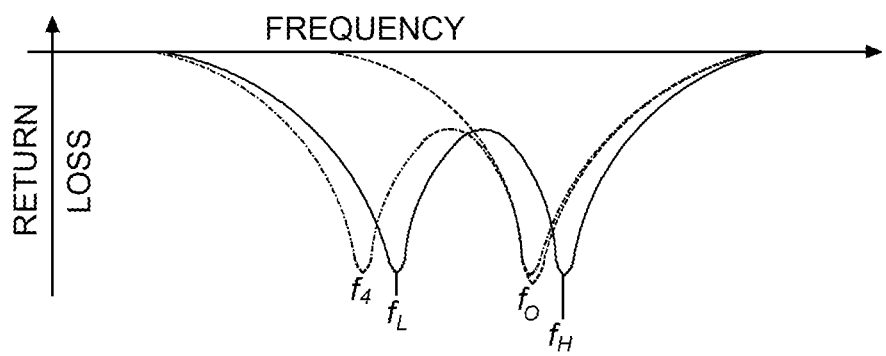
FIG. 1C illustrates an example frequency plot of the modal antenna of FIG. 1A according to example embodiments of the present disclosure.

FIG. 1C illustrates an example frequency plot of the modal antenna of FIG. 1A according to some aspects of the present disclosure. The frequency of the antenna can be shifted by controlling an electrical characteristic associated with at least one of the first or second parasitic elements 16, 18 of the modal antenna 10. For example, a first frequency ($f_0$) of the antenna can be achieved when the first and second parasitic elements are switched "Off"; the frequencies ($f_L$) and ($f_H$) can be produced when the second parasitic is shorted to ground; and the frequencies ($f_4$; $f_0$) can be produced when the first and second parasitic elements are each shorted to ground. It should be understood that other configurations are possible within the scope of this disclosure. For example, more or fewer parasitic elements can be employed. The positioning of the parasitic elements can be altered to achieve additional modes that can exhibit different frequencies and/or combinations of frequencies.

FIGS. 1A-1C depict one example modal antenna having a plurality of modes for purposes of illustration and discussion. Those of ordinary skill in the art, using the disclosures provided herein, will understand that other modal antennas and/or antenna configurations can be used without deviating from the scope of the present disclosure. As used herein a "modal antenna" refers to an antenna capable of operating in a plurality of modes where each mode is associated with a distinct radiation pattern.

Figure 2:
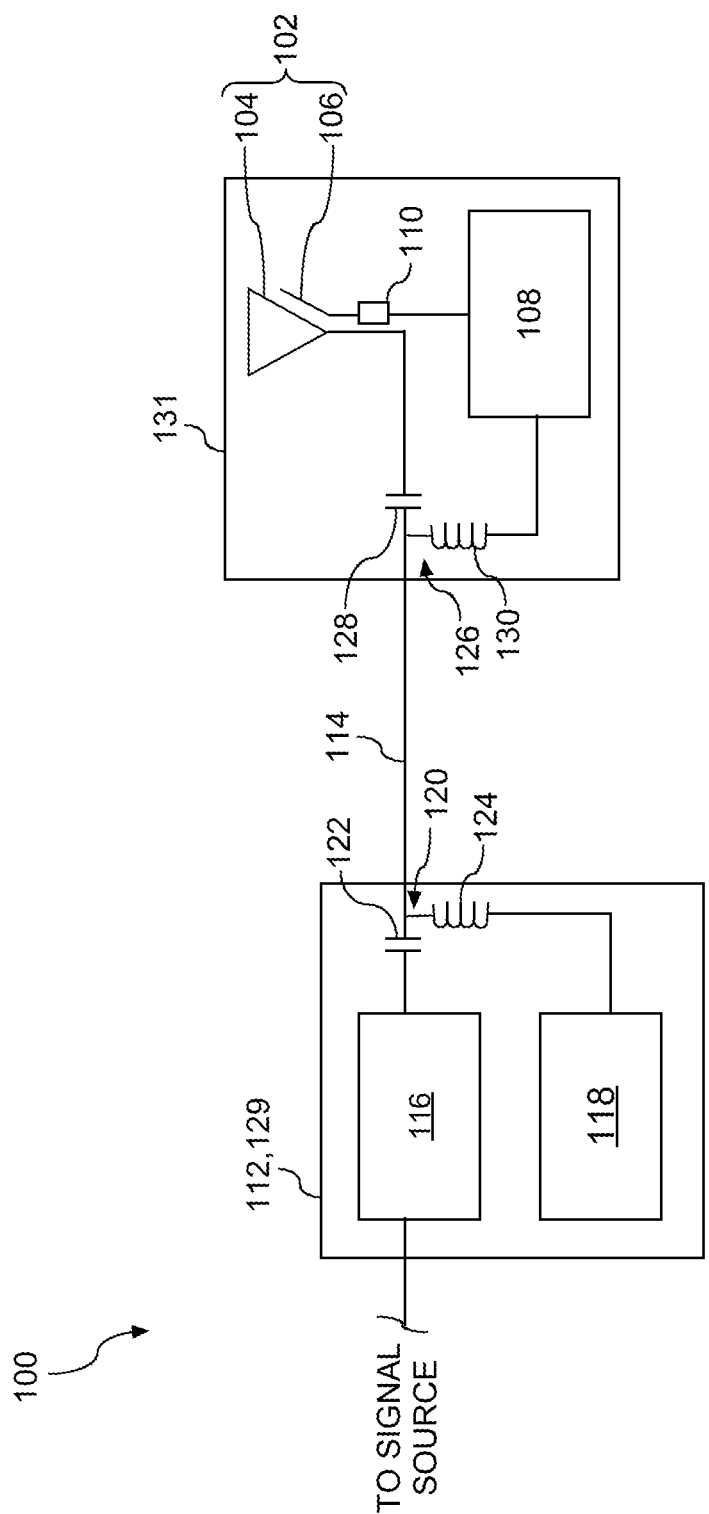
FIG. 2 illustrates a schematic diagram of an example antenna system according to example embodiments of the present disclosure.

FIG. 2 illustrates a schematic diagram of an embodiment of an antenna system 100 in accordance with example aspects of the present disclosure. The antenna system 100 can include a modal antenna 102. The modal antenna 102 can include a driven element 104 and a parasitic element 106 positioned proximate to the driven element 104. The modal antenna 102 can be operable in a plurality of different modes, and each mode can be associated with a different radiation pattern and/or polarization characteristic, for example as described above with reference to FIGS. 1A through 1C.

A tuning circuit 108 can be configured to control an electrical characteristic associated with the parasitic element 106 to operate the modal antenna 102 in the plurality of different modes. According to example aspects of the present disclosure, the tuning circuit 108 can be configured demodulate a control signal from a transmit signal and control the electrical characteristic of the parasitic element 106 based on control instructions associated with the control signal, for example as explained in greater detail with reference to FIGS. 4 and 5.

A tunable component 110 can be coupled with the parasitic element 106, and the tuning circuit 108 can be configured to control the tunable component 110 to alter the electrical connectivity of the parasitic element 106 with a voltage or current source or sink, such as connecting the parasitic element 106 with ground.

A radio frequency circuit 112 can be configured to transmit an RF signal to the driven element 104 of the modal antenna 102. For example, a transmission line 114 can couple the radio frequency circuit 112 to the modal antenna 102. In some embodiments, the transmission line 114 can be a single coaxial cable. The radio frequency circuit 112 can be configured to amplify or otherwise generate the RF signal, which is transmitted through the transmission line 114 (as a component of the transmit signal) to the driven element 104 of the modal antenna 102.

In some embodiments, the radio frequency circuit 112 can include a front end module 116 and/or a control circuit 118. The front end module 116 can be configured to generate and/or amplify the RF signal that is transmitted to and/or received from the driven element 104. The front end module 116 can include, for instance, one or more power amplifiers, low noise amplifiers, impedance matching circuits, etc. The control circuit 118 can be configured to modulate a control signal onto the RF signal using amplitude-shift keying modulation to generate the transmit signal, for example as explained in greater detail below with reference to FIG. 4.

The transmission line 114 can be coupled with various components (e.g., using Bias Tee circuits) that are configured to aid in the combination and/or separation of signals occupying various frequency bands. For example, a first Bias Tee circuit 120 can couple the front end module 116 and the control circuit 118 with the transmission line 114. The first Bias Tee circuit 120 can include a capacitor 122 coupling the transmission line 114 with front end module 116 and an inductor 124 coupling the control unit 118 with the transmission line 114. A second Bias Tee circuit 126 can couple the driven element 104 and the tuning circuit 108 with the transmission line 114. The second Bias Tee circuit 126 can include a capacitor 128 coupling the transmission line 114 with the driven element 104 and an inductor 130 coupling the transmission line 114 with the tuning circuit 108.

The front end module 116 can transmit the RF signal through the capacitor 122 of the first Bias Tee circuit 120. The control circuit 118 can modulate the control signal onto the RF signal through the inductor 124 of the first Bias Tee circuit 120 to generate the control signal in the transmission line 114. The tuning circuit 108 can de-modulate the control signal from the transmit signal via the inductor 130 of the second Bias Tee circuit 126. The RF signal component of the transmit signal can be transmitted to the driven element 104 of the modal antenna 102 via the capacitor 128 of the second Bias Tee circuit 126.

In some embodiments, the antenna system 100 can include a first circuit board 129 and a second circuit board 131 that is physically separate from the first circuit board 129. The radio frequency circuit 112 can be disposed on the first circuit board 129, and at least one of the tuning circuit 108 or modal antenna 102 can be disposed on the second circuit board 131. This can allow radio frequency circuit 112 to be physically separated from the tuning circuit and/or modal antenna 102 without employing multiple transmission lines or adversely affecting the operation of the antenna system 100.

In some embodiments, the RF signal can be defined within a first frequency band, and the control signal can be defined within a second frequency band that is distinct from the first frequency band. For example, the first frequency band can range from about 500 MHz to about 50 GHz, in some embodiments from about 1 GHz to about 25 GHz, in some embodiments from about 2 GHz to about 7 GHz, e.g., about 5 GHz. The second frequency band can range from about 10 MHz to about 1 GHz, in some embodiments from about 20 MHz to about 800 MHz, in some embodiments from about 30 MHz to about 500 MHz, in some embodiments from about 50 MHz to about 250 MHz, e.g., about 100 MHz.

Figure 3:
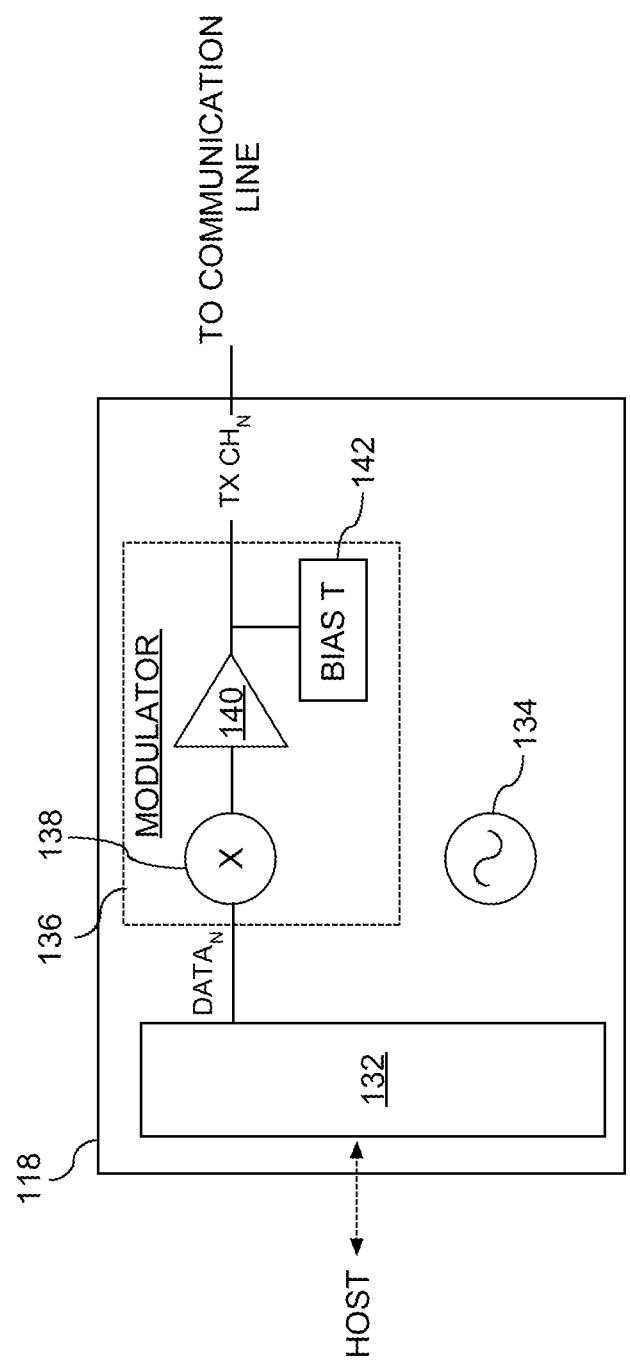
FIG. 3 illustrates a schematic diagram of an example control circuit of the antenna system according to example embodiments of the present disclosure.

FIG. 3 illustrates a schematic diagram of one embodiment of the control circuit 118 of the antenna system 100 illustrated in FIG. 2. The control circuit 118 can include a processor 132. The processor 132 can be configured to generate or receive control instructions for changing the mode of the modal antenna 102 (illustrated in FIG. 2), or otherwise adjusting the orientation or frequency of the radiation pattern of the modal antenna 102. For example, the processor 132 can receive the control instructions from another processor (represented by HOST in FIG. 3) and can generate an output that contains data (represented by $DATA_N$ in FIG. 3) that describes the instructions. The data can have any suitable bit depth. For example, in some embodiments the data can be in binary format. In other embodiments, the data can be in hexadecimal format, decimal format, etc. As will be discussed in detail below, the data can be encoded with a coding scheme that increases error detection according to example embodiments of the present disclosure.

The control circuit 118 can also include a carrier signal source 134. In some embodiments, the carrier signal source 134 can be configured to generate a carrier signal that includes a sinusoidal wave, which can have a generally constant frequency. In other embodiments, the carrier signal can be or include any suitable signal. For example, in some embodiments, the carrier signal can be or include any suitable repeating pattern, and is not limited to being sinusoidal or having a generally constant frequency.

The control circuit 118 can also include a modulator 136 that is configured to modulate the output of the processor onto the carrier signal to produce the control signal (represented by TX $CH_N$ in FIG. 3). The modulator 136 can include a multiplexer 138 that is configured to combine the output containing the data (represented by $DATA_N$ in FIG. 3), which can describe the control instructions, with the carrier signal from the carrier signal source 134. For example, the modulator 136 can be configured to scale the amplitude of the carrier signal from the carrier signal source 134 to produce the control signal, for example by performing amplitude shift keying modulation (e.g., on-off keying modulation), for example as described in greater detail below with reference to FIG. 4. The modulator 136 can also include an amplifier 140 and a Bias Tee circuit 142.

Figure 4:
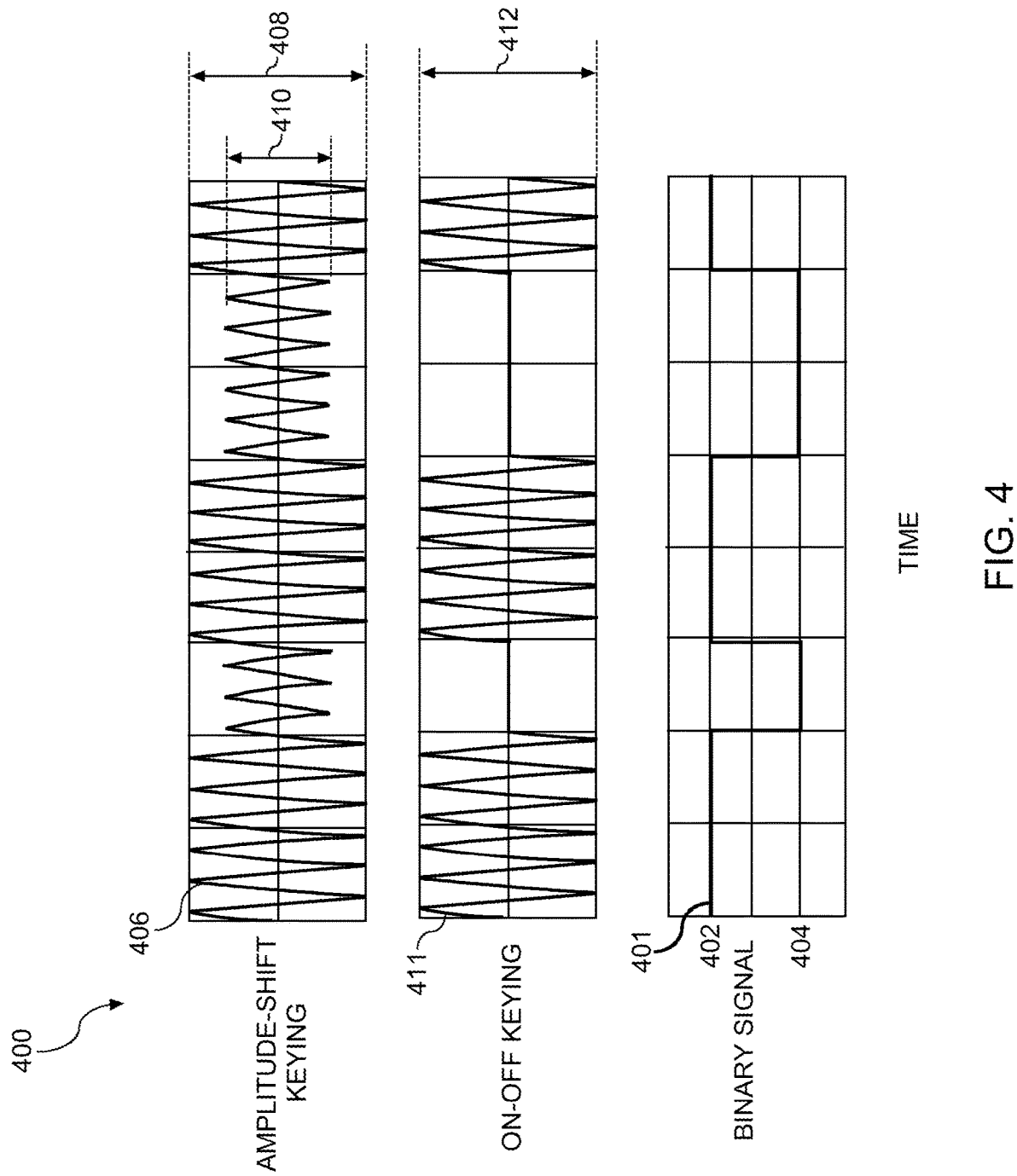
FIG. 4 illustrates a series of time-aligned charts representing simplified examples of amplitude-shift keying modulation and on-off keying modulation.

FIG. 4 illustrates a series of time-aligned charts 400 representing simplified examples of amplitude-shift keying modulation and on-off keying modulation. A binary signal 401 can alternate between a first voltage level 402 and a second voltage level 404 in a manner that describes the binary data set. The binary signal 401 can correspond to a simplified example of the output of processor 132, which can contain the data describing the control instructions, for example as described above with reference to FIG. 3. Amplitude-shift keying modulation can include representing the binary signal 401 by representing the first voltage level 402 as a sinusoidal signal 406 having a varying amplitude. For example, the sinusoidal signal 406 can have a first amplitude 408 that represents the first voltage 402 of the binary signal 401, and can have a second amplitude 410 that represents the second voltage level 404 of the binary signal 401.

On-off keying modulation is a type of amplitude-shift keying modulation. In on-off keying modulation, the binary signal 401 can be represented by a sinusoidal signal 411 having a varying amplitude. The sinusoidal signal 411 can have a first amplitude 412 that represents the first voltage level 402 of the binary signal 401. However, the second voltage level 404 can be represented by an absence of the sinusoidal signal 410. In other words, the sinusoidal signal 410 can have an amplitude of about zero to represent the second voltage 404 of the binary signal 401.

Figure 5:
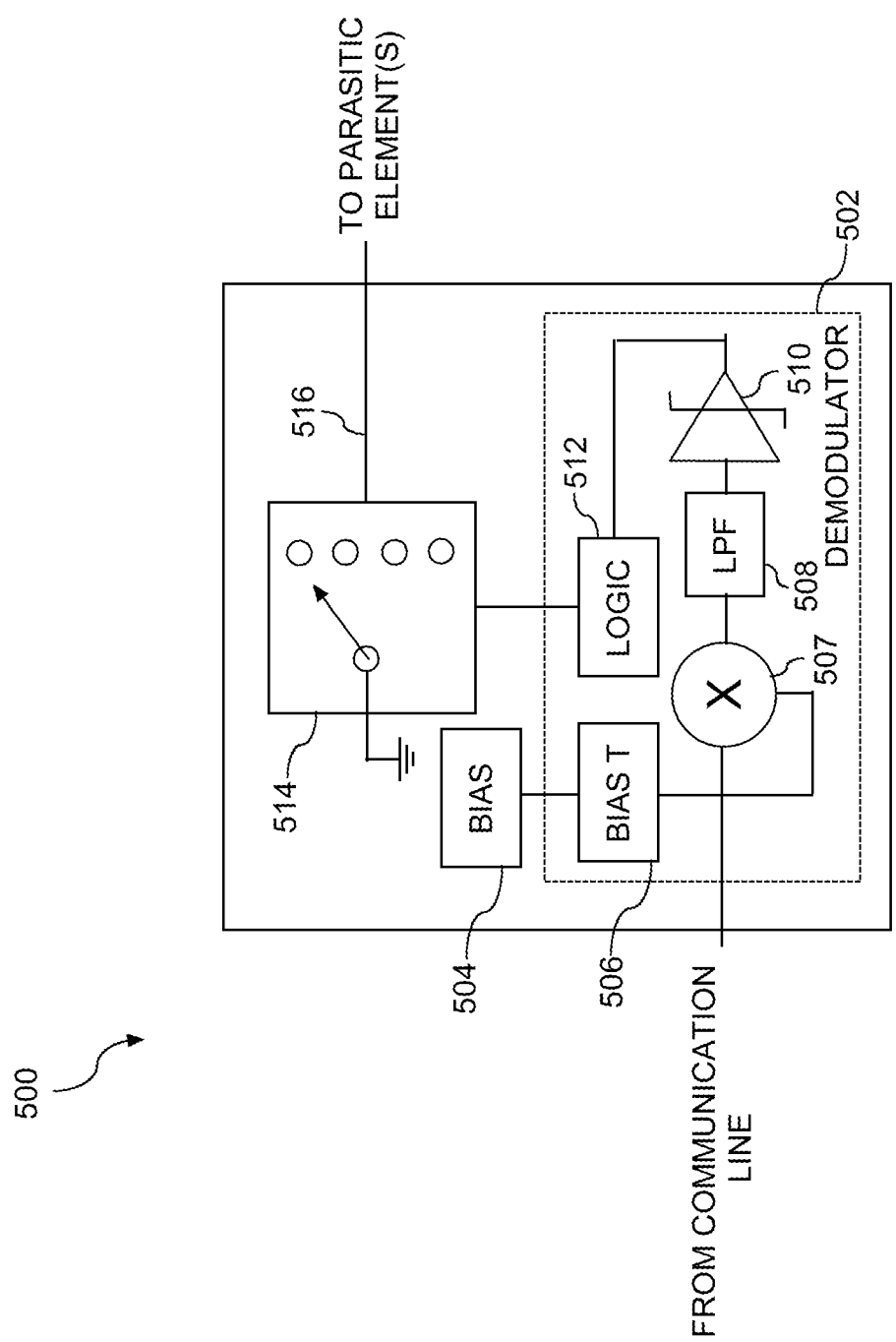
FIG. 5 illustrates a schematic diagram of an example tuning circuit of the antenna system according to example embodiments of the present disclosure.

FIG. 5 illustrates a schematic diagram of one embodiment of the tuning circuit 500, for example corresponding to the tuning circuit 108 discussed above with reference to FIG. 2, in accordance with aspects of the present disclosure. The tuning circuit 500 can include a demodulator 502 and a bias 504. The demodulator 502 can include a Bias Tee circuit 506 coupled with the bias 504, and multiplexer 507 that is coupled with the communication line 114 (illustrated in FIG. 2).

The tuning circuit 500 can also include a low pass filter 508 that is configured to filter at least one frequency band. For example, the low pass filter 508 can be configured to filter at least one frequency band that is higher than the frequency of the carrier signal frequency. As such, the low pass filter 508 can isolate or relatively increase the strength of the carrier signal frequency. The demodulator 502 can also include a diode 510, such as a Zener diode. The diode 510 can be coupled with a logic circuit 512 that is configured to interpret the control instructions associated with (e.g., contained within) the control signal.

The logic circuit 512 (e.g., processors, ASICS, etc. configured to execute computer-readable instructions to implement logic operations) can also be configured to control the operation of a switch 514 based on the control instructions associated with (e.g., contained within) the control signal. The switch 514 can be connected with ground and be configured to switch between a plurality of states. For example, the switch 514 can be configured to selectively connect an output 516 of the switch 514 with ground or otherwise vary the electrical connectivity of the output 516 to control an electrical characteristic associated with the parasitic element 106 (illustrated in FIG. 2) and operate the modal antenna in the plurality of different modes. For example, the switch 514 can be configured to adjust the operation of the tunable component 110 (illustrated in FIG. 2) to alter the electrical connectivity of the parasitic element 106 with a source or sink (e.g., a voltage source/sink or current source/sink), For example, the switch 514 can be configured to selectively connect the parasitic element 106 with ground.

The tuning circuit 500 (e.g., the logic circuit 512) can include a tunable frequency source, such as a local tunable harmonic oscillator (e.g., a ring oscillator) configured to provide the local clock frequency associated with the tuning circuit 500. The logic circuit 512 can be configured to sample the signal received by the logic circuit 512 (e.g., from the diode 510) and perform a frequency search operation with respect to the signal. The frequency search operation can determine an appropriate sampling frequency. For example, the logic circuit 512 can sample the control signal (or a conditioned version thereof that is output by the diode 510) for a time period corresponding to an expected phrase. The expected phrase can include a signal pattern that is expected to be present in the control signal. As an example, the expected phrase can present at the beginning and/or end of one or more transmitted data "frames" as a "preamble" or "postamble". The logic circuit 512 can be configured to recognize or detect the expected phrase to locate the beginning and/or end of the frame(s). The logic circuit 512 can then determine a phase error measured in terms of the number of local oscillator "clock edges" present in the sample compared with a number of local oscillator "clock edges" expected to be present in the sample based on the expected phrase.

The logic circuit 512 can then perform the frequency search operation. For example, the frequency search operation can include repeating the steps of (1) sampling for a time period corresponding to the length of the expected phrase, (2) determining a phase error by comparing the number of clock edges present in the sample with the number of expected clock edges, and (3) adjusting the local clock frequency (e.g., frequency of the local oscillator) until the local clock frequency is sufficiently synchronized with the master clock frequency associated with the control circuit 118. For example, the local clock frequency can be determined to be sufficiently synchronized when the phase error is less than a threshold (e.g., a predetermined threshold value).

In some embodiments, the tuning circuit can employ a numerically controlled oscillator that is configured to count data edge transitions of the signal received by the tuning circuit. If the number of data edge transitions fall outside of an expected range (e.g., a predetermined range), the tuning circuit can reject or ignore the associated data frame. If the count of data edge transitions falls within the expected range, the tuning circuit can adjust a frequency associated with an internal oscillator of the tuning circuit (e.g., the local clock frequency). For example, the tuning circuit can be configured to increase or decrease the internal oscillator frequency to compensate for drift between the frequency of the internal oscillator frequency of the tuning circuit and a clock or oscillator frequency associated with the RF circuit and/or control circuit, which can occur during normal operation.

The logic circuit 512 can also be configured to perform error detection. Example techniques implemented by the logic circuit 512 will be discussed with reference to FIGS. 7-16.

Figure 6:
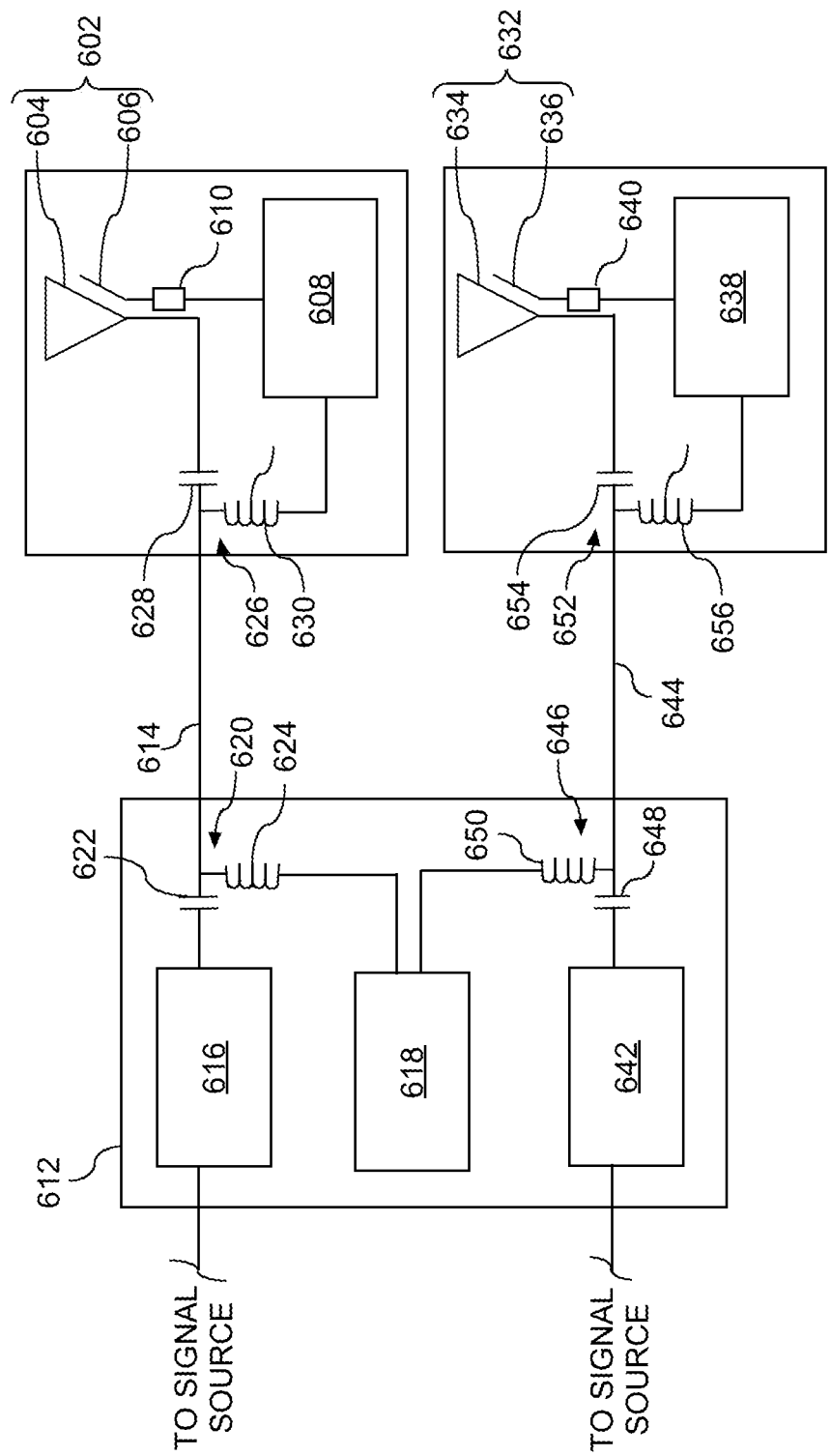
FIG. 6 illustrates a schematic diagram of an antenna system according to example embodiments of the present disclosure.

FIG. 6 illustrates another embodiment a schematic diagram of an embodiment of an antenna system 600 in accordance with aspects of the present disclosure. The antenna system 600 can be generally similarly configured to the antenna system 100 described above with reference to FIG. 2. For example, the antenna system 600 can include a modal antenna 602 including a driven element 604 and parasitic element 606, a tuning circuit 608, an RF circuit 612, a transmission line 614, front end module 616, control circuit 618, a first Bias Tee circuit 620 including a capacitor 622 and inductor 624, and a second Bias Tee circuit 626 including a capacitor 628 and inductor 630.

The antenna system 600 can also include a second modal antenna 632 including a driven element 634 and a parasitic element 636. A second tuning circuit 638 can be configured to control an electrical characteristic associated with the parasitic element 636 to operate the modal antenna 632 in the plurality of different modes. For example, a second tunable component 640 can be coupled with the parasitic element 636, and the tuning circuit 638 can be configured to control the second tunable component 640 to alter the electrical connectivity of the parasitic element 636 of the second modal antenna 632 with a voltage or current source or sink, such as connecting the parasitic element 106 with ground.

The radio frequency circuit 612 can include a second front end module 642 and a second transmission line 644. The second front end module 642 can be configured to generate and/or amplify a second RF signal. The control circuit 618 can be configured to modulate a second control signal onto the second RF signal to generate a second transmit signal. In some embodiments, the control circuit 618 can modulate the second control signal onto the second RF signal using amplitude-shift keying modulation, for example as explained above with reference to FIGS. 3 and 4.

The second transmission line 644 can be coupled with various components using Bias Tees configured to aid in the combination and/or separation of signals occupying various frequency bands. For example, a third Bias Tee circuit 646 can couple the second front end module 642 and the control circuit 618 with the second transmission line 644. The third Bias Tee circuit 646 can include a capacitor 648 coupling the second front end module 642 with the second transmission line 644 and an inductor 650 coupling the control unit 618 with the second transmission line 644.

A fourth Bias Tee circuit 652 can couple the second transmission line 644 with the driven element 634 of the second modal antenna 632 and the tuning circuit 108. The fourth Bias Tee circuit 652 can include a capacitor 654 coupling the second transmission line 644 with the driven element 634 of the second modal antenna 632 and a inductor 656 coupling the second transmission line 644 with the second tuning circuit 638.

The second front end module 642 can transmit the second RF signal through the capacitor 648 of the third Bias Tee circuit 646. The control circuit 618 can modulate the second control signal onto the second RF signal through the inductor 650 of the third Bias Tee circuit 646 to generate the second transmit signal. The second tuning circuit 638 can de-modulate the control signal from the second transmit signal via the inductor 656 of the fourth Bias Tee circuit 652. The RF signal component of the second transmit signal can be transmitted to the driven element 634 of the second modal antenna 632 via the capacitor 654 of the fourth Bias Tee circuit 652.

In this embodiment, the control circuit 618 can have a separate output associated with each of the transmission lines 614, 644. The control circuit 618 can be similarly configured as the control circuit 118 described above with reference to FIG. 3 and can include additional or components configured to provide the separate output for the second transmission line 644. For example, the control circuit 618 can include a second processor 132, sinusoidal wave source 134, modulator 136, multiplexer 138, amplifier 140 and/or Bias Tee circuit 142 such that a second output is provided.

In some embodiments, the antenna system can include a plurality of antennas in a multiple-in-multiple-out (MIMO) configuration. Multiple pairs of control circuits and tuning circuits can be configured to control multiple modal antennas as well as multiple passive antennas. For example, the antenna system can include N tuning circuits (each paired with a respective control circuit) configured to control the operation of M modal antennas and (N-M) passive antennas, where N and M are each positive integers, and where N is greater than or equal to M. Additionally, in some embodiments, one control circuit can include multiple outputs and be paired with multiple tuning circuits, for example as described with reference to FIG. 6. In any event, the number of tuning circuits, N, can range up to any suitable number. For example, in some embodiments, N can range from 2 to 20, or greater. M can also range from 2 to 20, or greater.

It should be understood that many variations are possible within the scope of this disclosure. For example, in other embodiments, a separate control circuit can be associated with each transmission line 614, 644. Additionally, in other embodiments, a single front end module can be configured to generate the respective RF signals. In some embodiments, a single tuning circuit can be configured to control an electrical characteristic associated with a parasitic element of each modal antenna of the system. Moreover, in some embodiments, the system can include more than two modal antennas. Additionally, in some embodiments, the system can include a combination of one or more modal antennas and one or more non-modal or passive antennas that are not configured to operate in a plurality of modes. In some embodiments, one or more modal antennas can include more than one parasitic element. A single control circuit can be configured to adjust respective tunable elements associated with the parasitic elements to control electrical characteristics associated with the parasitic elements and operate the modal antenna in the plurality of different modes. In other embodiments, multiple control circuits can be used to respectively adjust the tunable elements. It should be understood that yet other variations, modification, combinations, and the like are possible with the scope of this disclosure.

Figure 7:
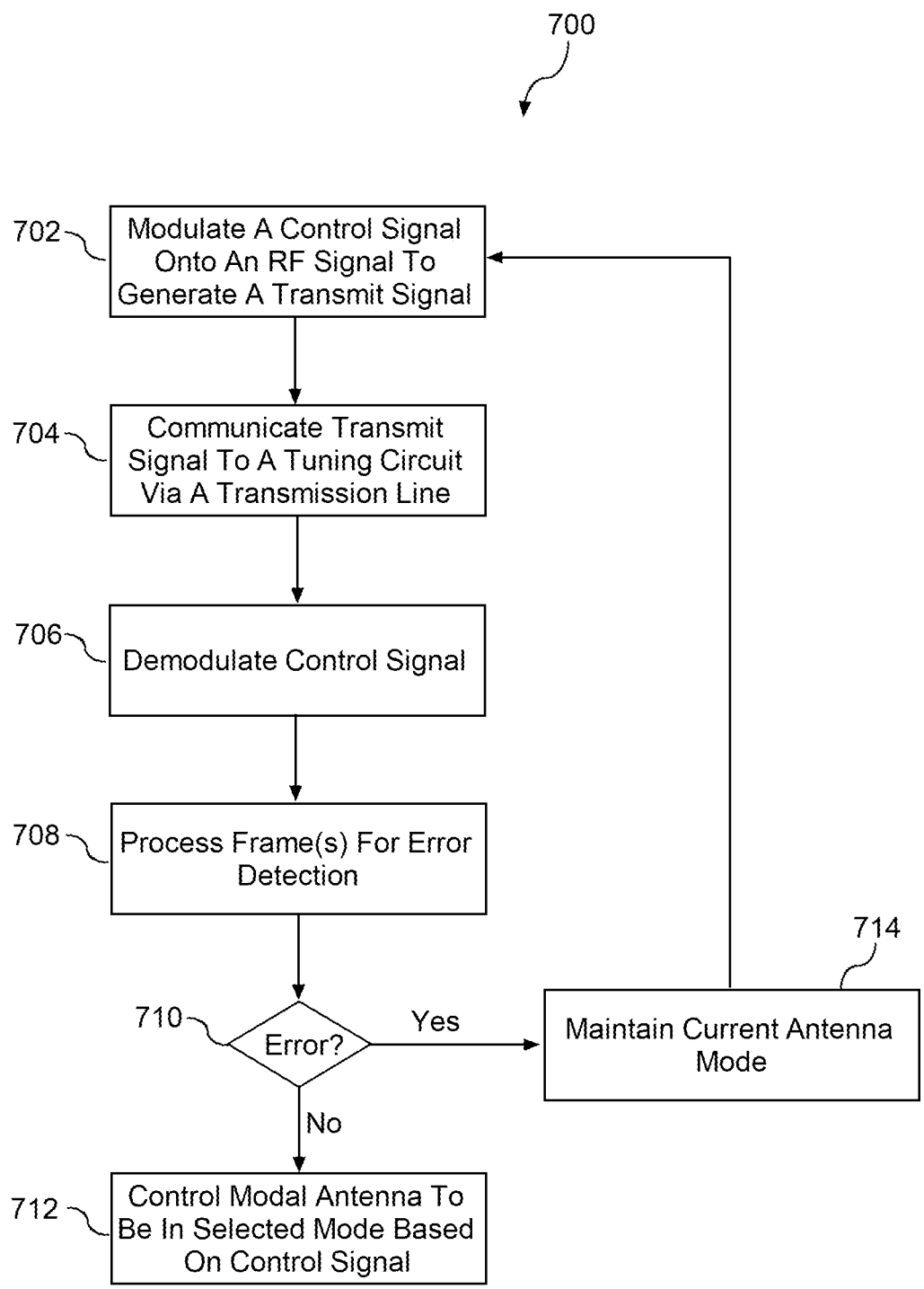
FIG. 7 depicts a flow diagram of an example method according to example embodiments of the present disclosure.

FIG. 7 depicts a flow diagram of an example method 700 according to example embodiments of the present disclosure. FIG. 7 depicts steps performed in a particular order for purposes of illustration and discussion. Those of ordinary skill in the art, using the disclosures provided herein, will understand that various steps of any of the methods described herein can be omitted, expanded, performed simultaneously, rearranged, and/or modified in various ways without deviating from the scope of the present disclosure. In addition, various steps (not illustrated) can be performed without deviating from the scope of the present disclosure. Additionally, the method 700 is generally discussed with reference to the antenna systems 200, 600 described above with reference to FIGS. 2 and 6. However, it should be understood that aspects of the present method 700 can find application with any suitable antenna system including a modal antenna.

The method 700 can include, at (702), modulating a control signal onto an RF signal to generate a transmit signal. For example, the control signal can contain control instructions for changing the mode of the modal antenna or otherwise adjusting the orientation or frequency of the radiation pattern of the modal antenna. For example, the radio frequency circuit 112 can include a control circuit 118 that is configured to modulate the control signal onto the RF signal to generate a transmit signal, for example as described above with reference to FIGS. 3 and 4.

The control signal can be implemented in one or more frames. Each frame an include a plurality of bits. The frame(s) can specify a selected mode of the plurality of modes for operation of the modal antenna. The control signal (e.g., instructions) can be encoded with a coding scheme that increases error detection by the tuning circuit. For instance, the coding scheme can assign a unique code to each mode of the plurality of modes.

In some embodiments, the unique code can be encoded using 11 bits or more (e.g., 11 bits, 21 bits). The unique code for each mode can differ by at least two bits relative to the unique code for each other mode in the plurality of modes, such as by at least three bits, such as by at least four bits, such as by at least five bits, such as by at least six bits, such as by at least seven bits, such as by at least eight bits, etc. As a result, the unique code for each mode in the plurality of modes is separated a significant distance (e.g., in terms of binary code) from the unique code for each of the other antenna modes.

Figure 8:
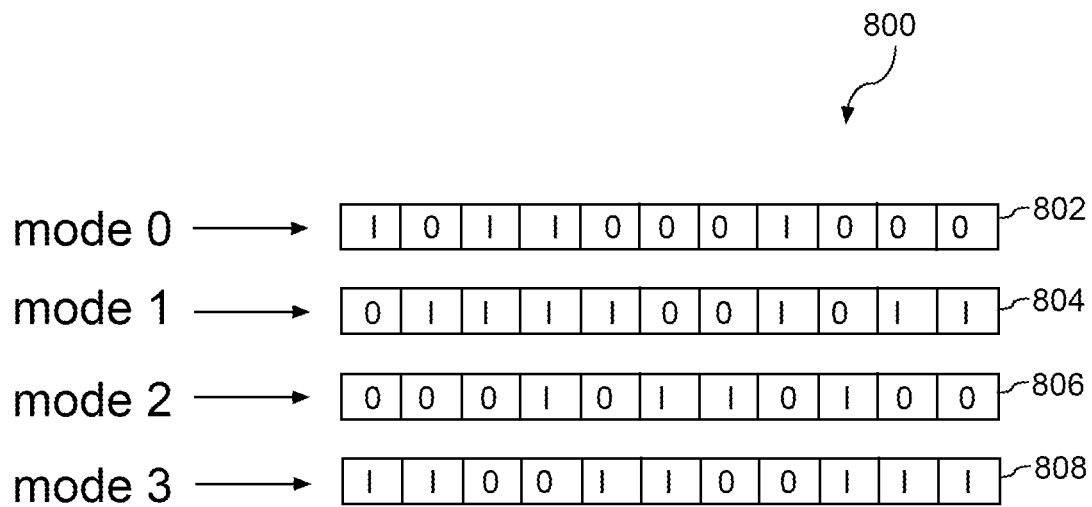
FIG. 8 depicts an example coding scheme for a plurality of antenna modes according to example embodiments of the present disclosure.

For instance, FIG. 8 depicts an example coding scheme 810 according to example embodiments of the present disclosure. The coding scheme 810 assigns unique 11 bit codes to each of four different antenna modes: Mode 0, Mode 1, Mode 2, and Mode 3. More particularly, code 802 is assigned to Mode 0. Code 804 is assigned to Mode 1. Code 806 is assigned to Mode 2. Code 808 is assigned to Mode 3.

Aspects of the present disclosure are discussed with reference to four modes for purposes of illustration and discussion. Those of ordinary skill in the art, using the disclosures provided herein, will understand that any number of modes can be used without deviating from the scope of the present disclosure, such as 8 modes, 16 modes, 32 modes, etc. In addition, aspects of the present disclosure are discussed with reference to unique codes implemented in binary format. Those of ordinary skill in the art, using the disclosures provided herein, will understand that other numerical schemes can be used (e.g., decimal, hexadecimal) without deviating from the scope of the present disclosure.

Referring to FIG. 8, the codes 802, 804, 806, and 808 in the coding scheme 806 differ by at least two bits, such as by at least five bits relative to each other. As a result, the codes 802, 804, 806, and 808 are separated a significant distance from each other. This facilitates error detection as discussed below.

Referring to FIG. 7, the method 700 can include, at (704), communicating the transmit signal to a tuning circuit via a single coaxial transmission line. For example, as described above with reference to the radio frequency circuit 112 can include a front end module 116 that can communicate the RF signal through a capacitor 122 of a first Bias Tee 120, through a transmission line 114, and through a capacitor 128 of a second Bias Tee 128 to a driven element 104 of a modal antenna 102. The control circuit 118 can modulate a control signal onto the RF signal through the inductor 124 of the first Bias Tee 120, through the transmission line 114, and through the inductor 130 of the second Bias Tee 128 to the tuning circuit 108.

The method 700 can include, at (706), demodulating the control signal at the tuning circuit. For example, as described above with reference to FIGS. 2 and 5, the tuning circuit 108, 500 can be configured to demodulate the control signal from the transmit signal via the inductor 130 of the second Bias Tee 126. The tuning circuit 108, 500 can also be configured to filter and/or amplify the control signal to isolate or relatively increase the strength of a carrier signal frequency associated with a carrier signal. A logic circuit 512 can be configured to interpret control instructions associated with (e.g., contained in) the control signal.

For instance, at (708), the method can include processing the frame(s) of the control signal (e.g., the bits in the control signal) for error detection. For instance, the logic circuit 512 can process the plurality of bits in the frame(s) to determine if the unique code matches a unique code assigned to a mode in the coding scheme.

Figure 9:
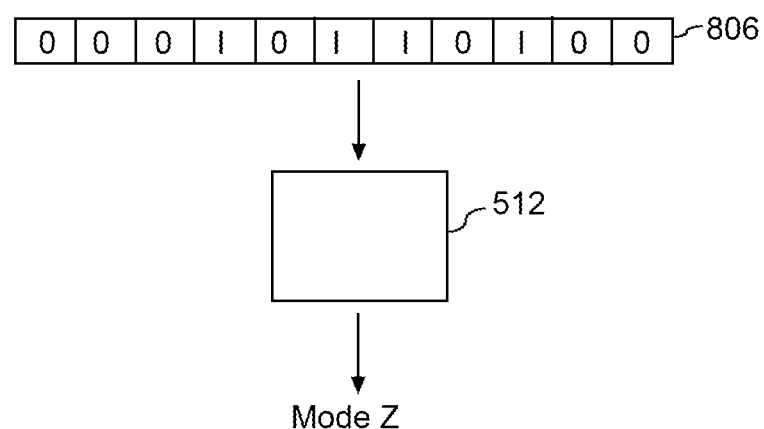
FIG. 9 depicts example control of a modal antenna according to example embodiments of the present disclosure.

As an illustrative example, FIG. 9 depicts a logic circuit 512 of an example tuning circuit processing a plurality of bits in the frame(s) received over the transmission line. The logic circuit 512 can process the bits and determine that the bits match unique code 806. As a result, the logic circuit 512 can determine that the control signal has control instructions to operate the modal antenna in Mode 2.

Figure 10:
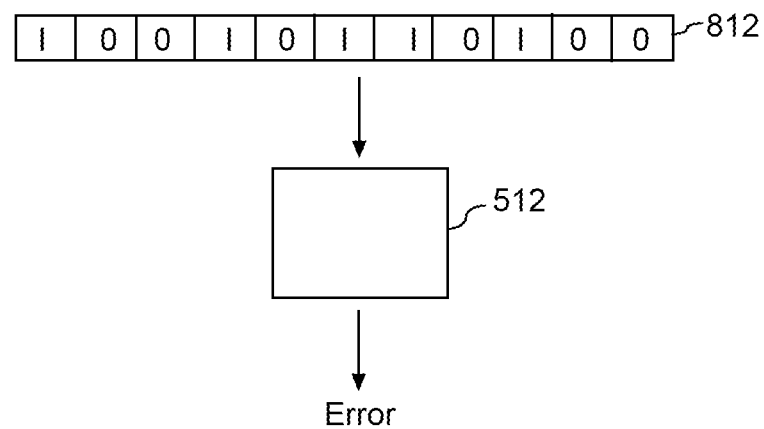
FIG. 10 depicts example error detection according to example embodiments of the present disclosure.

FIG. 10 depicts a logic circuit 512 of an example tuning circuit processing a plurality of bits 812. The plurality of bits 812 differ from unique code 806 by only one bit. However, because the plurality of bits 812 do not match a unique code in the coding scheme 810, the logic circuit 512 can easily detect an error—despite only one bit being incorrect. This error detection is facilitated by the unique codes in the coding scheme being separated a significant distance to reduce errors matching with other unique codes.

Referring to FIG. 7 at (710), if no error is present the method can proceed to (712) to control the modal antenna in accordance with the selected mode specified by the unique code. For instance, the method 700 can include controlling an electrical characteristic associated with a parasitic element of a modal antenna based at least in part on the control signal to control the modal antenna in the selected mode.

Referring to FIG. 7 at (710), if an error is detected, the method can proceed to (714) wherein the tuning circuit maintains the current mode of the antenna. In other words, the tuning circuit does not respond to the control signal containing the error and maintains the modal antenna in its current mode.

Figure 11:
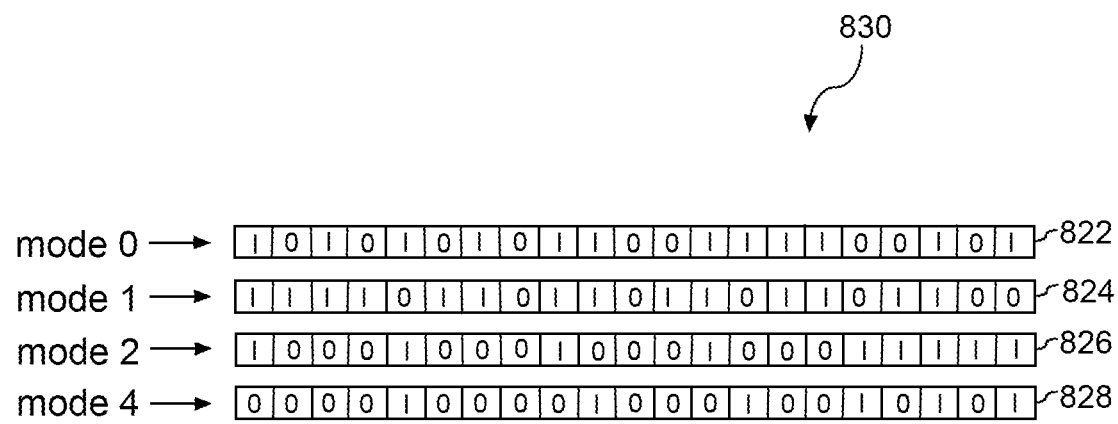
FIG. 11 depicts an example coding scheme for a plurality of antenna modes according to example embodiments of the present disclosure.

FIG. 11 depicts an example coding scheme 830 according to example embodiments of the present disclosure. The coding scheme 830 assigns unique 21 bit codes to each of four different antenna modes: Mode 0, Mode 1, Mode 2, and Mode 3. More particularly, code 822 is assigned to Mode 0. Code 824 is assigned to Mode 1. Code 826 is assigned to Mode 2. Code 828 is assigned to Mode 3. The codes 822, 824, 826, and 828 in the coding scheme 806 differ by at least two bits, such as by at least five bits relative to each other, such as by at least 8 bits. As a result, the codes 822, 824, 826, and 828 are separated a significant distance from each other. This facilitates error detection.

Figure 12:
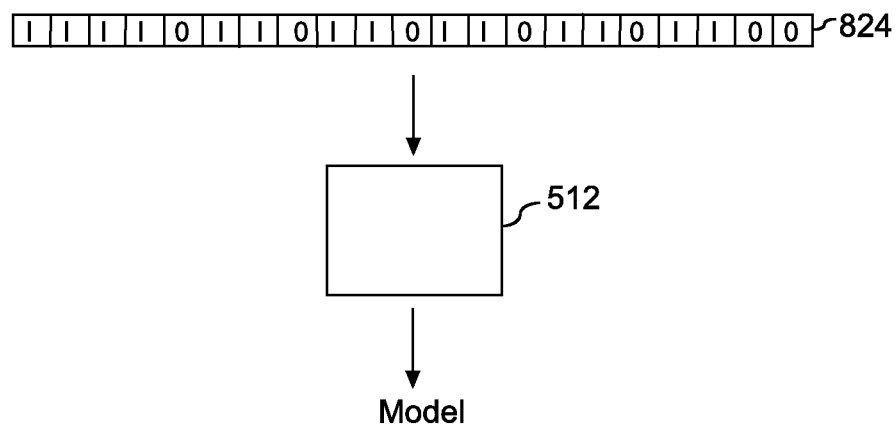
FIG. 12 depicts example control of a modal antenna according to example embodiments of the present disclosure.
Figure 13:
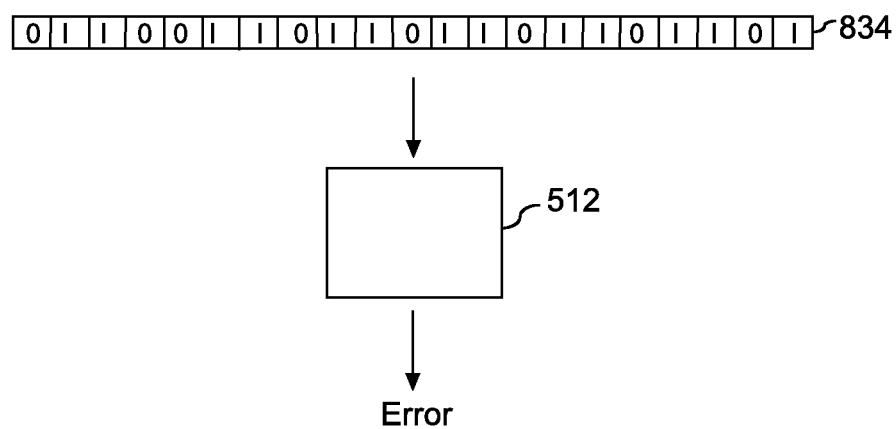
FIG. 13 depicts example error detection according to example embodiments of the present disclosure.
Figure 14:
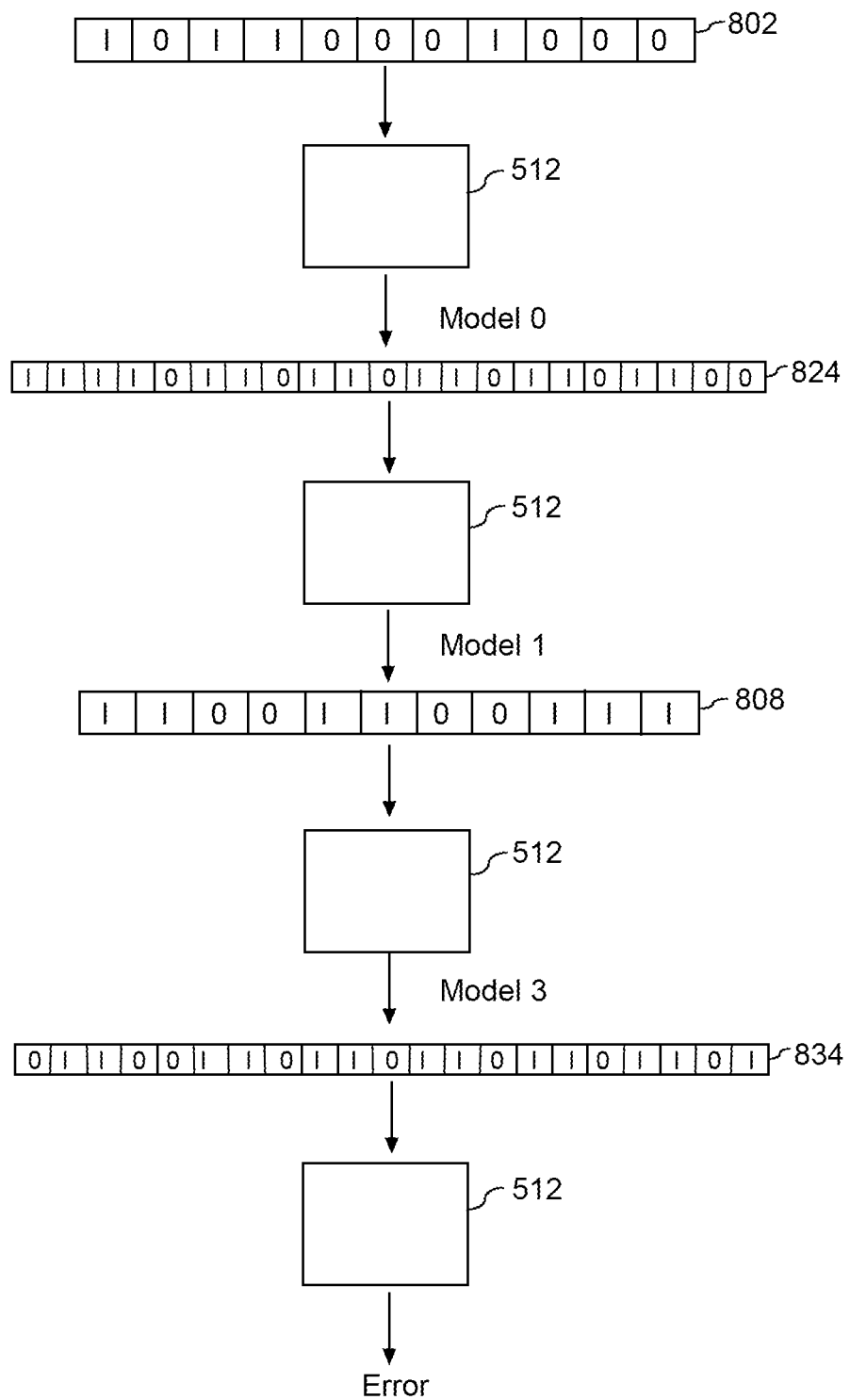
FIG. 14 depicts example error detection according to example embodiments of the present disclosure.

As an illustrative example, FIG. 12 depicts a logic circuit 512 of an example tuning circuit processing a plurality of bits in the frame(s) received over the transmission line. The logic circuit 512 can process the bits and determine that the bits match unique code 824. As a result, the logic circuit 512 can determine that the control signal has control instructions to operate the modal antenna in Mode 1.

FIG. 10 depicts a logic circuit 512 of an example tuning circuit processing a plurality of bits 832. The plurality of bits 832 differ from unique code 824 by only two bits. However, because the plurality of bits 832 do not match a unique code in the coding scheme 810, the logic circuit 512 can easily detect an error—despite only two bits being incorrect. This error detection is facilitated by the unique codes in the coding scheme being separated a significant distance to reduce errors matching with other unique codes.

In some embodiments, further enhance robustness of the system, the RF circuit can be configured to communicate control signal(s) using alternating frames of differing sizes. For instance, the RF circuit can alternate communicating frames of a first frame size (e.g., 11 bits) and a second frame size (e.g., 21 bits). The first frame can include a plurality of bits encoded with unique codes according to a first coding scheme, such as coding scheme 810 shown in FIG. 8. The first coding scheme can assign unique codes with the number of bits in the first frame size (e.g., 11 bits) for each mode in the plurality of modes.

The second frame can include a plurality of bits encodes with unique codes according to a second coding scheme, such as coding scheme 830 shown in FIG. 11. The second coding scheme can assign unique codes with the number of bits (e.g., 21 bits) in the second frame size for each mode in the plurality of modes.

Figure 15:
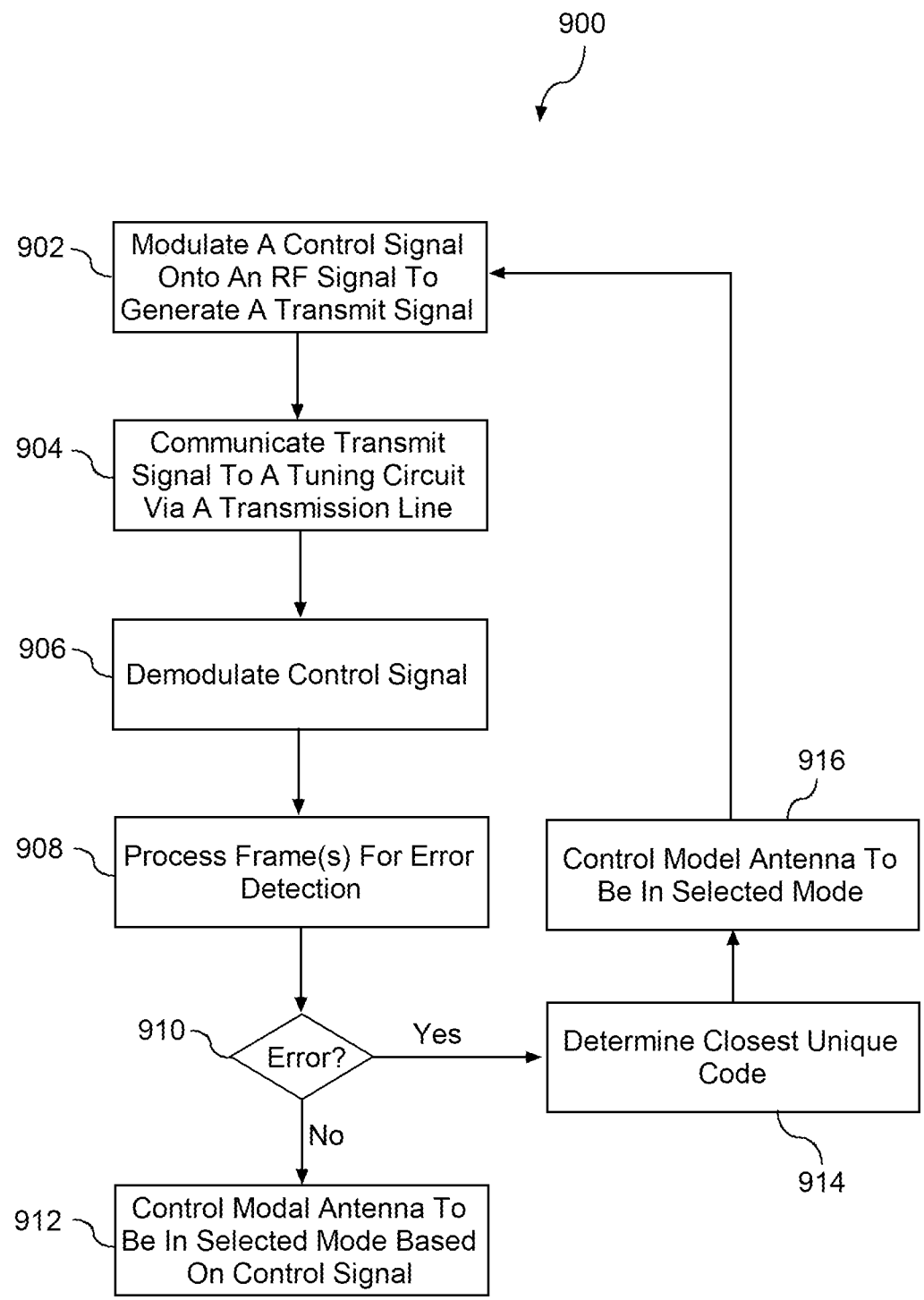
FIG. 15 depicts an example method according to example embodiments of the present disclosure.

The tuning circuit can be configured to alternately process the frames of differing sizes. As an illustrative example, FIG. 15 depicts a logic circuit 512 of an example tuning circuit processing a plurality of bits in a first frame having a first frame size of 11 bits received over the transmission line. The logic circuit 512 can process the bits and determine that the bits match unique code 802. As a result, the logic circuit 512 can determine that the control signal has control instructions to operate the modal antenna in Mode 0.

The logic circuit 512 of an example tuning circuit can process a plurality of bits in a second frame having a second frame size of 21 bits received over the transmission line. The logic circuit 512 can process the bits and determine that the bits match unique code 824. As a result, the logic circuit 512 can determine that the control signal has control instructions to operate the modal antenna in Mode 1.

The logic circuit 512 of an example tuning circuit processing a plurality of bits in a third frame having a first frame size of 11 bits received over the transmission line. The logic circuit 512 can process the bits and determine that the bits match unique code 808. As a result, the logic circuit 512 can determine that the control signal has control instructions to operate the modal antenna in Mode 3.

The logic circuit 512 of an example tuning circuit can process a plurality of bits in a second frame having a second frame size of 21 bits received over the transmission line. The logic circuit 512 can process the bits 834 and determine that the bits do not match a unique code in the coding scheme 830. As a result, the logic circuit 512 can detect an error.

FIG. 15 depicts a flow diagram of an example method 900 according to example embodiments of the present disclosure. FIG. 15 depicts steps performed in a particular order for purposes of illustration and discussion. Those of ordinary skill in the art, using the disclosures provided herein, will understand that various steps of any of the methods described herein can be omitted, expanded, performed simultaneously, rearranged, and/or modified in various ways without deviating from the scope of the present disclosure. In addition, various steps (not illustrated) can be performed without deviating from the scope of the present disclosure. Additionally, the method 900 is generally discussed with reference to the antenna systems 200, 600 described above with reference to FIGS. 2 and 6. However, it should be understood that aspects of the present method 900 can find application with any suitable antenna system including a modal antenna.

The method 900 can include, at (902), modulating a control signal onto an RF signal to generate a transmit signal. For example, the control signal can contain control instructions for changing the mode of the modal antenna or otherwise adjusting the orientation or frequency of the radiation pattern of the modal antenna. For example, the radio frequency circuit 112 can include a control circuit 118 that is configured to modulate the control signal onto the RF signal to generate a transmit signal, for example as described above with reference to FIGS. 3 and 4.

The control signal can be implemented in one or more frames. Each frame an include a plurality of bits. The frame(s) can specify a selected mode of the plurality of modes for operation of the modal antenna. The control signal (e.g., instructions) can be encoded with a coding scheme that increases error detection by the tuning circuit. For instance, the coding scheme can assign a unique code to each mode of the plurality of modes.

In some embodiments, the unique code can be encoded using 11 bits or more (e.g., 11 bits, 21 bits). The unique code for each mode can differ by at least two bits relative to the unique code for each other mode in the plurality of modes, such as by at least three bits, such as by at least four bits, such as by at least five bits, such as by at least six bits, such as by at least seven bits, such as by at least eight bits, etc. As a result, the unique code for each mode in the plurality of modes is separated a significant distance (e.g., in terms of binary code) from the unique code for each of the other antenna modes.

The method 900 can include, at (904), communicating the transmit signal to a tuning circuit via a single coaxial transmission line. For example, as described above with reference to the radio frequency circuit 112 can include a front end module 116 that can communicate the RF signal through a capacitor 122 of a first Bias Tee 120, through a transmission line 114, and through a capacitor 128 of a second Bias Tee 128 to a driven element 104 of a modal antenna 102. The control circuit 118 can modulate a control signal onto the RF signal through the inductor 124 of the first Bias Tee 120, through the transmission line 114, and through the inductor 130 of the second Bias Tee 128 to the tuning circuit 108.

The method 900 can include, at (906), demodulating the control signal at the tuning circuit. For example, as described above with reference to FIGS. 2 and 5, the tuning circuit 108, 500 can be configured to demodulate the control signal from the transmit signal via the inductor 130 of the second Bias Tee 126. The tuning circuit 108, 500 can also be configured to filter and/or amplify the control signal to isolate or relatively increase the strength of a carrier signal frequency associated with a carrier signal. A logic circuit 512 can be configured to interpret control instructions associated with (e.g., contained in) the control signal.

For instance, at (908), the method can include processing the frame(s) of the control signal (e.g., the bits in the control signal) for error detection. For instance, the logic circuit 512 can process the plurality of bits in the frame(s) to determine if the unique code matches a unique code assigned to a mode in the coding scheme.

At (910), if no error is present the method can proceed to (912) to control the modal antenna in accordance with the selected mode specified by the unique code. For instance, the method 700 can include controlling an electrical characteristic associated with a parasitic element of a modal antenna based at least in part on the control signal to control the modal antenna in the selected mode.

At (910), if an error is detected, the method can proceed to (914) wherein the tuning circuit determines the closest unique code. For instance, the tuning circuit can determine that the bits differ from a certain unique code in the coding scheme by only one or two bits. The tuning circuit can correct the error bits to match a unique code specified in the coding scheme. The method can proceed to (916) to control the modal antenna in accordance with the selected mode specified by the closest unique code.

Figure 16:
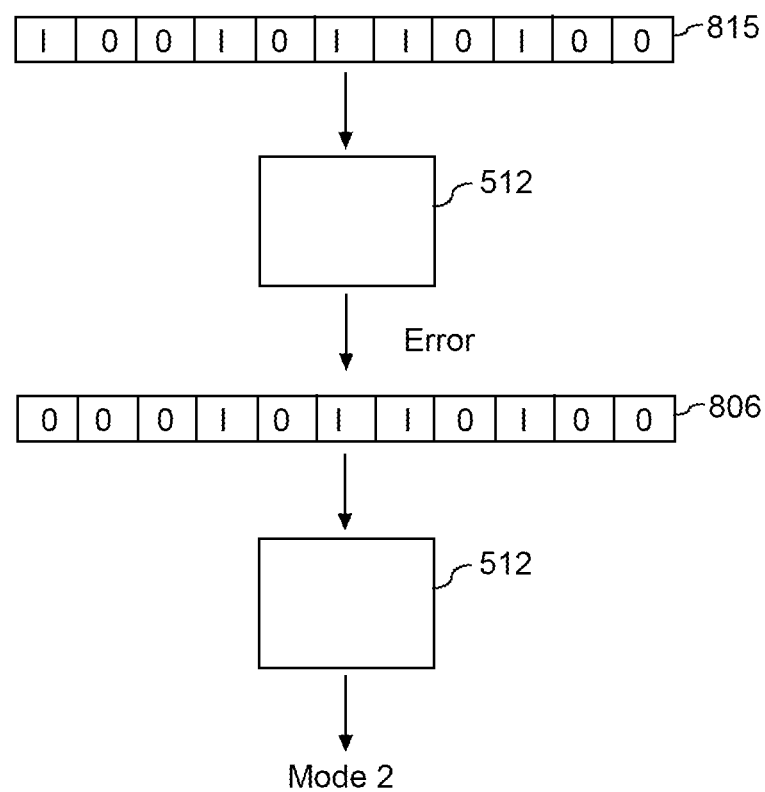
FIG. 16 depicts example error detection and control of a modal antenna according to example embodiments of the present disclosure.

As an illustrative example, FIG. 16 depicts a logic circuit 512 of an example tuning circuit processing a plurality of bits 815. The plurality of bits 832 differ from unique code 806 by only one bit. Accordingly, the logic circuit 512 can detect an error—despite only two bits being incorrect. The logic circuit 512 can correct the bit to match the closest unique code 806. The logic circuit 512 can then determine that the control signal has control instructions to operate the modal antenna in Mode 2. In this way, the antenna system can still control the modal antenna in accordance with a specified mode despite errors in communication of the control signal over a transmission line.

While the present subject matter has been described in detail with respect to specific example embodiments thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An antenna system comprising:
a modal antenna configurable in a plurality of modes, each of the plurality of modes associated with a different radiation pattern;
a radio frequency circuit configured to encode a control signal according to a coding scheme, the coding scheme specifying a plurality of unique codes, each of the plurality of unique codes corresponding to a different mode of the plurality of modes of the modal antenna, the radio frequency circuit further configured to modulate the control signal onto a radio frequency signal according to a modulation scheme to generate a transmit signal; and
a tuning circuit associated with the modal antenna, the tuning circuit configured to:
  demodulate the transmit signal to obtain the control signal;
  subsequent to demodulating the transmit signal to obtain the control signal, determine the control signal is encoded with a code other than one of the plurality of unique codes specified by the coding scheme;
  determine a first unique code included in the plurality of unique codes and corresponding to a first mode of the plurality of modes differs the least from the code encoded in the control signal; and configure the modal antenna in the first mode of the plurality of modes.

2. The antenna system of claim 1, wherein each of the unique codes is at least 11 bits.

3. The antenna system of claim 2, wherein each of the plurality of unique codes differ from one another by at least two bits.

4. The antenna system of claim 1, wherein the radio frequency circuit comprises:
a front end module configured to generate the radio frequency signal; and
a control circuit configured to modulate the control signal onto the radio frequency signal.

5. The antenna system of claim 1, wherein:
the radio frequency circuit is disposed on a first circuit board; and
the tuning circuit is disposed on a second circuit board.

6. The antenna system of claim 5, wherein the modal antenna is disposed on the second circuit board.

7. The antenna system of claim 5, wherein the radio frequency circuit is configured to communicate the transmit signal over a transmission line have a first end communicatively coupled to the first circuit board and a second end communicatively coupled to the second circuit board.

8. The antenna system of claim 7, wherein the transmission line comprises a coaxial cable.

9. The antenna system of claim 1, wherein to determine the first unique code differs the least from the code encoded in the control signal, the tuning circuit is configured to determine the first unique code differs from the code in encoded in the control by less than 2 bits.

10. The antenna system of claim 1, wherein the tuning circuit is further configured to:
correct the code encoded in the control signal the first unique code of the plurality of unique codes.

11. A method for controlling operation of a modal antenna, the method comprising:
encoding, by a radio frequency circuit, a control signal according to a coding scheme, the coding scheme specifying a plurality of unique codes, each of the plurality of unique codes corresponding to a different mode of a plurality of modes in which the modal antenna is operable, each of the plurality of modes having a different radiation pattern;
modulating, by the radio frequency circuit, the control signal onto a radio frequency signal according to a modulation scheme to generate a transmit signal;
demodulating, by a tuning circuit, the transmit signal to obtain the control signal;
subsequent to demodulating the transmit signal, determining, by the tuning circuit, determining the control signal is encoded with a code other than one of the plurality of unique codes specified by the coding scheme;
determining, by the tuning circuit, a first unique code included in the plurality of unique codes and corresponding to a first mode of the plurality of modes differs the least from the code encoded in the control signal; and
configuring, by the tuning circuit, the modal antenna in the first mode of the plurality of modes.

12. The method of claim 11, further comprising:
communicating the transmit signal over a transmission line to the tuning circuit.

13. The method of claim 12, wherein the transmission line comprises a single coaxial cable.

14. The method of claim 11, wherein each of the unique codes is at least 11 bits.

15. The method of claim 14, wherein each of the plurality of unique codes differ from one another by at least two bits.

16. The method of claim 11, wherein the modulation scheme comprises a digital modulation scheme.

17. The method of claim 16, wherein the digital modulation scheme comprises amplitude shift keying.

18. The method of claim 17, wherein the amplitude shift keying comprises on-off keying.

* * * * *